(12) United States Patent
Chono

(10) Patent No.: US 9,998,752 B2
(45) Date of Patent: Jun. 12, 2018

(54) VIDEO ENCODING METHOD, VIDEO ENCODING DEVICE, AND VIDEO ENCODING PROGRAM

(71) Applicant: NEC Corporation, Minato-ku, Tokyo (JP)

(72) Inventor: Keiichi Chono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 348 days.

(21) Appl. No.: 14/436,303

(22) PCT Filed: Oct. 24, 2013

(86) PCT No.: PCT/JP2013/006290
§ 371 (c)(1),
(2) Date: Apr. 16, 2015

(87) PCT Pub. No.: WO2014/073173
PCT Pub. Date: May 15, 2014

(65) Prior Publication Data
US 2015/0281726 A1 Oct. 1, 2015

(30) Foreign Application Priority Data

Nov. 6, 2012 (JP) ................................ 2012-244700

(51) Int. Cl.
*H04N 7/12* (2006.01)
*H04N 19/52* (2014.01)
(Continued)

(52) U.S. Cl.
CPC ........... *H04N 19/52* (2014.11); *H04N 19/105* (2014.11); *H04N 19/139* (2014.11);
(Continued)

(58) Field of Classification Search
None
See application file for complete search history.

(56) References Cited

U.S. PATENT DOCUMENTS

2011/0206117 A1  8/2011  Bivolarsky et al.
2012/0269270 A1*  10/2012  Chen .................... H04N 19/597
                                              375/240.16
(Continued)

FOREIGN PATENT DOCUMENTS

JP  2012-186762 A  9/2012
JP  2012-209911 A  10/2012
(Continued)

OTHER PUBLICATIONS

Korean Office Action for KR Application No. 10-2015-7011674 dated Feb. 21, 2017 with English Translation.
(Continued)

*Primary Examiner* — Dakshesh D Parikh

(57) ABSTRACT

A video encoding device: searches for motion information of a block to be encoded; generates a merge motion information candidate list based on motion information of encoded blocks adjacent to the block to be encoded; eliminates an improper merge index or indexes from the merge motion information candidate list, using the motion information determined as a result of the search for the motion information; and determines a merge mode, using a merge index of merge motion information in the merge motion information candidate list from which the improper merge index has been eliminated.

9 Claims, 11 Drawing Sheets

(51) Int. Cl.
*H04N 19/105* (2014.01)
*H04N 19/176* (2014.01)
*H04N 19/172* (2014.01)
*H04N 19/30* (2014.01)
*H04N 19/139* (2014.01)
*H04N 19/147* (2014.01)

(52) U.S. Cl.
CPC ......... *H04N 19/147* (2014.11); *H04N 19/172* (2014.11); *H04N 19/176* (2014.11); *H04N 19/30* (2014.11)

(56) References Cited

U.S. PATENT DOCUMENTS

| | | | |
|---|---|---|---|
| 2013/0177076 A1* | 7/2013 | Itani | H04N 19/105 375/240.03 |
| 2013/0215968 A1 | 8/2013 | Jeong et al. | |

FOREIGN PATENT DOCUMENTS

| | | | | |
|---|---|---|---|---|
| KR | 10-2012-0044917 A | 5/2012 | | |
| WO | 2012/023763 A2 | 2/2012 | | |
| WO | WO 2012042719 A1 * | 4/2012 | ........... | H04N 19/105 |

OTHER PUBLICATIONS

International Search Report for PCT Application No. PCT/JP2013/006290, dated Jan. 28, 2014.

Il-Koo Kim, "HM7: High Efficiency Video Coding (HEVC) Test Model 7 Encoder Description", JCTVC-I1002, Geneva, Apr. 27-May 7, 2012 Joint Collaborative Team on Video Coding (JCT-VC) of ITU-T SG16 WP3 and ISO/IEC JTC1/SC29/WG11.

Benjamin Bross, "High efficiency video coding (HEVC) text specification draft 7",JCTVC-I1003_d9, Geneva, Apr. 27-May 7, 2012, by Joint Collaborative Team on Video Coding (JCT-VC) of ITU-T SG16 WP3 and ISO/IEC JTC1/SC29/WG11.

Kim et al., HM7: High Efficiency Video Coding(HEVC) Test Model 8 Encoder Description VCT-VC of ITU-T and ISO/IEC. JCTVC-J1002 Ver. 1, Oct. 9, 2012, pp. 1-36.

Korean Office Action for KR Application No. 10-2015-7011674 dated Aug. 25, 2016.

"Bi-pred merge restriction for small PUs", Tammy Lee et al., Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Sections 2.2 and 5.2.

"RD Optimized Coding for Motion Vector Predictor Selection", Guillaume Laroche et al., IEEE Transactions on Circuits and Systems for Video Technology, vol. 18, No. 9, pp. 1247-1257, Sep. 2008.

"Improved Advanced Motion Vector Prediction", Jian-Liang Lin et al., Joint Collaborative Team on Video Coding (JCT-VC) of ITU-T SG16 WP3 and ISO/IEC JTC1/SC29/WG11, 4th Meeting: Daegu, KR, Jan. 20-28, 2011, Section 2.

"Low-Complexity merge candidate decision for fast HEVC encoding", Muchen Li et al., 2013 IEEE International Conference on Multimedia and Expo Workshops (ICMEW), IEEE, Jul. 15, 2013, pp. 1-6.

Extended European Search Report for EP Application No. EP13853006.8 dated Jul. 19, 2016.

* cited by examiner

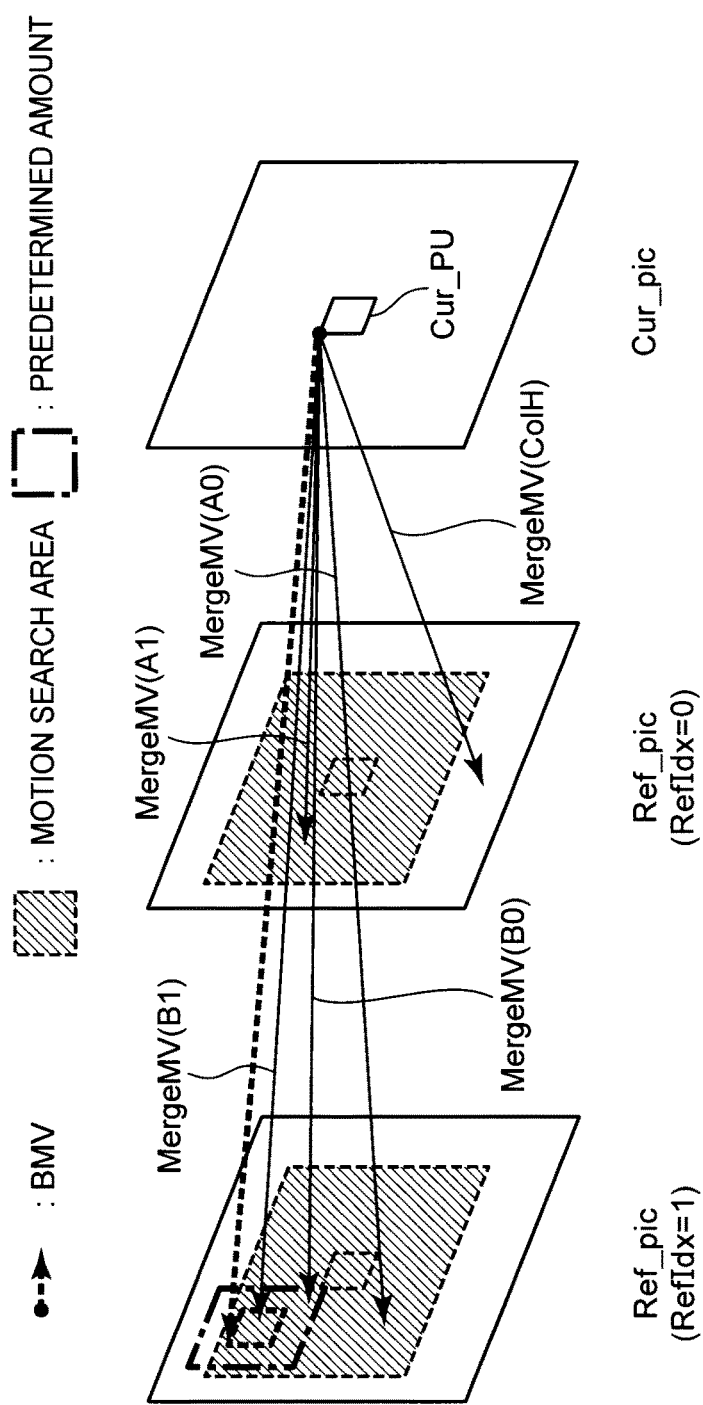

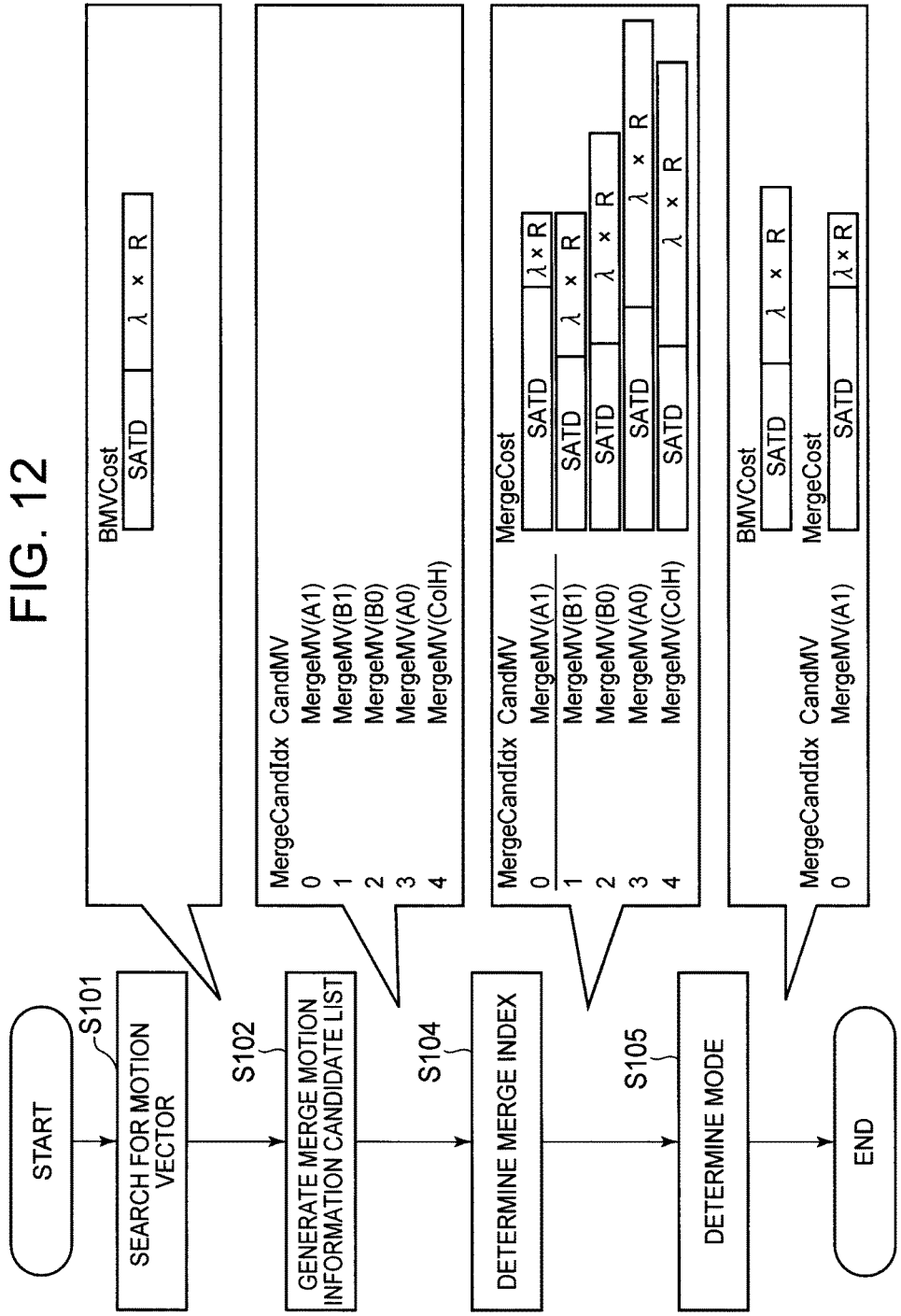

VIDEO ENCODING METHOD, VIDEO ENCODING DEVICE, AND VIDEO ENCODING PROGRAM

This application is a National Stage Entry of PCT/JP2013/006290 filed on Oct. 24, 2013, which claims priority from Japanese Patent Application 2012-244700 filed on Nov. 6, 2012, the contents of all of which are incorporated herein by reference, in their entirety.

TECHNICAL FIELD

The present invention relates to a video encoding device, and particularly relates to an encoding control technique related to merge index determination.

BACKGROUND ART

In motion compensated prediction in inter-frame prediction, an image of a block to be encoded (current prediction unit: Cur_PU) is predicted using an image of a previously encoded reference picture (Ref Pic). The reference picture used for the motion compensated prediction of the block to be encoded is identified by a reference picture index (RefPicIdx). The position of the image of the reference picture used for the motion compensated prediction of the block to be encoded is identified by a motion vector (MV). Typically, the MV is predicted based on a predictive motion vector (PMV), and a differential motion vector (DMV=MV−PMV) is transmitted.

In motion vector search, the combination of the reference picture index and the motion vector that minimizes the coding cost is determined so as to achieve favorable coding efficiency of the block to be encoded. The coding cost J of a motion vector my is defined by the sum of absolute values of transform coefficients of motion compensated prediction errors (sum of absolute transformed differences: SATD), the reference picture index, and the code amount ($R_{Motion}$) of the differential motion vector, as in the following Expression (1).

[Math. 1]

$$J(mv) = SATD(mv) + \lambda_{Motion} \cdot R_{Motion}(mv) \quad (1)$$

Here, λ is a function dependent on a quantization parameter QP. The value of λ is smaller when the quantization parameter is smaller (when the quantization step size is smaller), and larger when the quantization parameter is larger (when the quantization step size is larger). In detail, λ is defined as in the following Expression (2).

[Math. 2]

$$\lambda_{Motion}(QP) = 2^{\frac{QP-12}{6}} \quad (2)$$

In the computation of the coding cost J, the sum of absolute values of motion compensated prediction errors (sum of absolute differences: SAD) may be used instead of SATD.

FIG. 9 is a conceptual diagram depicting a state where a combination of a reference picture index and a motion vector (MV) used for motion compensated prediction of a block to be encoded is determined from images of two previously encoded reference pictures (RefIdx=0, 1). As depicted in FIG. 9, in motion vector search, the coding cost J of a candidate motion vector my included in a motion search area of each of the two reference pictures is computed, and a combination of a reference picture index (RefIdx=1 in the example depicted in FIG. 9) and a motion vector (MV=BMV) that minimizes the coding cost J is obtained.

High Efficiency Video Coding (HEVC) has been studied as a successor standard to H.264/AVC. HEVC defines a new concept, that is, a motion compensated prediction mode called merge mode.

FIG. 10 is an explanatory diagram of the merge mode. The left part of FIG. 10 depicts a prediction block to be encoded (current prediction unit: Cur_PU). Blocks A0, A1, B0, B1, and B2 are encoded blocks adjacent to Cur_PU in a reference picture. The center part of FIG. 10 depicts an encoded block (referred to as collocate PU: Col_PU) of a picture temporally adjacent to Cur_PU. Block C is a block at the center position of Col_PU. Block H is a block positioned on the lower right side of Col_PU.

The right part of FIG. 10 depicts the relationships between the picture to be encoded (Cur_Pic) including Cur_PU and the picture (Col_Pic) including Col_PU and their reference pictures (Cur_Ref and Col_Pef).

A video encoding device that uses the merge mode generates a predictive motion vector using motion vectors of blocks A0, A1, B0, B1, B2, C, and H. For a block (block of MergeFlag=1) to which the merge mode is applied, the video encoding device generates a merge motion information candidate list including up to five candidates, based on motion information of encoded blocks at four spatially adjacent positions (blocks A1, B1, B0, and A0 (block B2 in the case where any of blocks A1, B1, B0, and A0 cannot be used)) and an encoded block of one picture adjacent on the time axis (block H, or block C (in the case where block H cannot be used)). The arrows in the left part of FIG. 10 indicate the order in which the blocks are selected.

The video encoding device sets merge motion information identified by an index (merge index) in the merge motion information candidate list, as the motion information of the block of MergeFlag=1. In other words, for the block of MergeFlag=1, the video encoding device transmits only a merge index, and does not transmit a reference picture index and a differential motion vector. Merge indices are expressed by truncated unary codes. Accordingly, the codes of MergeIdx=0, MergeIdx=1, MergeIdx=2, MergeIdx=3, and MergeIdx=4 are respectively 1 bit (0), 2 bits (10), 3 bits (110), 4 bits (1110), and 4 bits (1111).

The process of deriving the merge motion information candidate list is described in detail in 8.5.2.1 Derivation process for motion vector components and reference indices in Non Patent Literature (NPL) 2. The process of deriving the merge motion information candidate list is also briefly described in 3.4.1.1 to 3.4.1.4 in NPL 1.

CITATION LIST

Non Patent Literatures

NPL 1: JCTVC-I1002, Geneva, 27 Apr.-7 May 2012 Joint Collaborative Team on Video Coding (JCT-VC) of ITU-T SG16 WP3 and ISO/IEC JTC1/SC29/WG11

NPL 2: JCTVC-I1003_d9, Geneva, 27 Apr.-7 May 2012, by Joint Collaborative Team on Video Coding (JCT-VC) of ITU-T SG16 WP3 and ISO/IEC JTC1/SC29/WG11

SUMMARY OF INVENTION

Technical Problem

A merge mode selection method is described below, with reference to an explanatory diagram in FIG. 11 and a flowchart in FIG. 12.

FIG. 11 depicts Cur_PU and two reference pictures (RefIdx=0, 1), as an example. The dotted arrow indicates BMV which is motion information (motion vector) determined as a result of motion vector search. MergeMV(A1), MergeMV(B0), MergeMV(B1), and MergeMV(A0) indicate motion vectors derived from the positions of blocks A1, B0, B1, and A0, respectively. MergeMV(ColH) indicates a motion vector derived from the position of encoded block H of Col_Pic. The video encoding device selects the merge mode in the following manner.

In the example depicted in FIG. 11, MergeMV(A1), MergeMV(B1), MergeMV(B0), and MergeMV(A0) are motion information included in the motion vector search area. MergeMV(B1), MergeMV(B0), and MergeMV(A0) are motion information of the same reference picture as BMV. MergeMV(B1) and MergeMV(B0) are each motion information whose difference from BMV is not greater than a predetermined amount.

In step S101, the video encoding device performs motion vector search. FIG. 12 also depicts the coding cost (BMV-Cost) of BMV. The coding cost is the sum of SATD and the amount of auxiliary information. The amount of auxiliary information is expressed by ($\lambda \times$motion vector code amount R).

In step S102, the video encoding device generates a merge motion information candidate list. In detail, the video encoding device computes MergeMV(A1), MergeMV(B0), MergeMV(B1), MergeMV(A0), and MergeMV(ColH).

In step S104, the video encoding device determines a merge index. In detail, the video encoding device computes the coding cost (the sum of SATD and ($\lambda \times$R)) of each of MergeMV(A1), MergeMV(B0), MergeMV(B1), MergeMV(A0), and MergeMV(ColH), specifies a motion vector with the smallest coding cost, and selects the merge index (MergeCandIdx) of the specified motion vector. In the example depicted in FIG. 12, the coding cost of MergeMV(A1) is smallest. Note that the correspondence between each motion vector indicated in CandMV and MergeCandIdx in FIG. 12 is set beforehand.

In step S105, the video encoding device determines a mode. In other words, the video encoding device determines whether MergeCandIdx determined in the process of step S104 or a differential motion vector based on the normal motion vector (BMV) searched for in the process of step S101 is to be transmitted. In detail, the video encoding device compares the coding cost of the motion vector (MergeMV(A1) in this example) specified by MergeCandIdx (MergeCandIdx=0 in this example) determined in the process of step S104 and the coding cost of BMV, and determines to transmit the one with the smaller coding cost. In the example depicted in FIG. 12, the coding cost of MergeMV(A1) is smaller.

In the case of using the merge mode, it is necessary to compute the coding costs of as many pieces of merge motion information as the merge motion information candidates, as described above. In the merge mode, the merge motion information candidate list including up to five candidates can be generated. Accordingly, the coding costs of up to five pieces of merge motion information need to be computed in order to determine the merge index for achieving favorable coding efficiency of the block to be encoded.

Besides, if the coding costs of all merge motion information candidates are always evaluated to determine the merge index, there is a possibility that merge motion information completely different from the motion information determined as a result of the motion vector search is merged with the block to be encoded, which causes degradation in image quality.

The code length of a merge index tends to be shorter than the code length of a reference picture index and a differential motion vector. Therefore, at a lower bit rate (when the quantization parameter QP is larger), the coding cost $J_{Merge}$ of the merge mode is more likely to be smaller than the coding cost J of the normal mode. In other words, at a lower bit rate, the merge mode is more likely to be selected than the normal mode. Moreover, since the code length of a merge index is proportional to the index value (MergeIdx=0 is 1 bit, MergeIdx=1 is 2 bits, MergeIdx=2 is 3 bits, MergeIdx=3 is 4 bits, and MergeIdx=4 is 4 bits), at a lower bit rate a small merge index is more likely to be selected than a large merge index.

In the merge mode, a reference picture index and a differential motion vector are not transmitted, and so the receiver may not be always able to faithfully reproduce the motion information of the block to be encoded. In such circumstances, if the video encoding device wrongly selects a merge index (hereafter referred to as an improper merge index) corresponding to merge motion information completely different from the motion information determined as a result of the motion vector search, such merge motion information that increases the motion compensated prediction error is merged with the block to be encoded. This causes degradation in image quality of the block to be encoded.

In the example depicted in FIG. 12, the merge mode is selected in the process of step S105 because the coding cost of MergeMV(A1) is smaller than the coding cost of BMV. SATD is, however, smaller in BMV. This being so, if the video decoding device executes the decoding process using MergeMV(A1), the image quality degrades locally.

The present invention has an object of preventing selection of an improper merge index and also reducing the computational complexity of coding costs.

Solution to Problem

A video encoding method according to the present invention includes: searching for motion information of a block to be encoded; generating a merge motion information candidate list based on motion information of encoded blocks adjacent to the block to be encoded; eliminating an improper merge index or indexes from the merge motion information candidate list, using the motion information determined as a result of the search for the motion information; and determining a merge mode, using a merge index of merge motion information in the merge motion information candidate list from which the improper merge index has been eliminated.

A video encoding device according to the present invention includes: a motion information search unit which searches for motion information of a block to be encoded; a merge motion information candidate list generation unit which generates a merge motion information candidate list based on motion information of encoded blocks adjacent to the block to be encoded; a merge index elimination unit which eliminates an improper merge index or indexes from the merge motion information candidate list, using the motion information determined by the motion information search unit; and a merge index determination unit which determines a merge mode, using a merge index of merge motion information in the merge motion information candidate list from which the improper merge index has been eliminated.

A video encoding device according to another aspect of the present invention includes: a motion information search unit which searches for motion information of a block to be encoded; a merge motion information candidate list generation unit which generates a merge motion information candidate list based on motion information of encoded blocks adjacent to the block to be encoded; and a merge index output unit which outputs a merge index corresponding to motion information whose coding cost is not smallest of motion information corresponding to merge indices included in the merge motion information candidate list.

A video encoding program according to the present invention causes a computer to execute: a process of searching for motion information of a block to be encoded; a process of generating a merge motion information candidate list based on motion information of encoded blocks adjacent to the block to be encoded; a process of eliminating an improper merge index or indexes from the merge motion information candidate list, using the motion information determined as a result of the search for the motion information; and a process of determining a merge mode, using a merge index of merge motion information in the merge motion information candidate list from which the improper merge index has been eliminated.

A recording medium according to the present invention is a recording medium in which a video encoding program is recorded, wherein upon operating based on the video encoding program, a processor: searches for motion information of a block to be encoded; generates a merge motion information candidate list based on motion information of encoded blocks adjacent to the block to be encoded; eliminates an improper merge index or indexes from the merge motion information candidate list, using the motion information determined as a result of the search for the motion information; and determines a merge mode, using a merge index of merge motion information in the merge motion information candidate list from which the improper merge index has been eliminated.

Advantageous Effects of Invention

According to the present invention, the computational complexity of coding costs can be reduced.

BRIEF DESCRIPTION OF DRAWINGS

FIG. 11 It is an explanatory diagram depicting Cur_PU and reference pictures.
FIG. 12 It is a block diagram depicting a typical merge mode determination process.

DESCRIPTION OF EMBODIMENTS

Exemplary Embodiment 1

Figure 1:
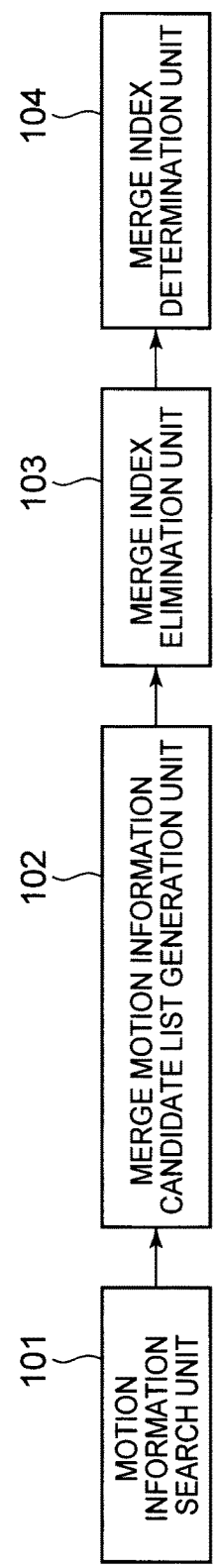
FIG. 1 It is a block diagram depicting Exemplary Embodiment 1 of a video encoding device.

FIG. 1 is a block diagram depicting Exemplary Embodiment 1 of a video encoding device. The video encoding device depicted in FIG. 1 includes a motion information search unit 101, a merge motion information candidate list generation unit 102, a merge index elimination unit 103, and a merge index determination unit 104.

The motion information search unit 101 searches for motion information of a block to be encoded. The merge motion information candidate list generation unit 102 generates a merge motion information candidate list based on motion information of encoded blocks adjacent to the block to be encoded. The merge index elimination unit 103 eliminates a merge index of improper merge motion information from the merge motion information candidate list, using the motion information determined by the motion information search unit 101. The merge index determination unit 104 determines a merge index of merge motion information to be merged with the motion information of the block to be encoded.

Figure 2:
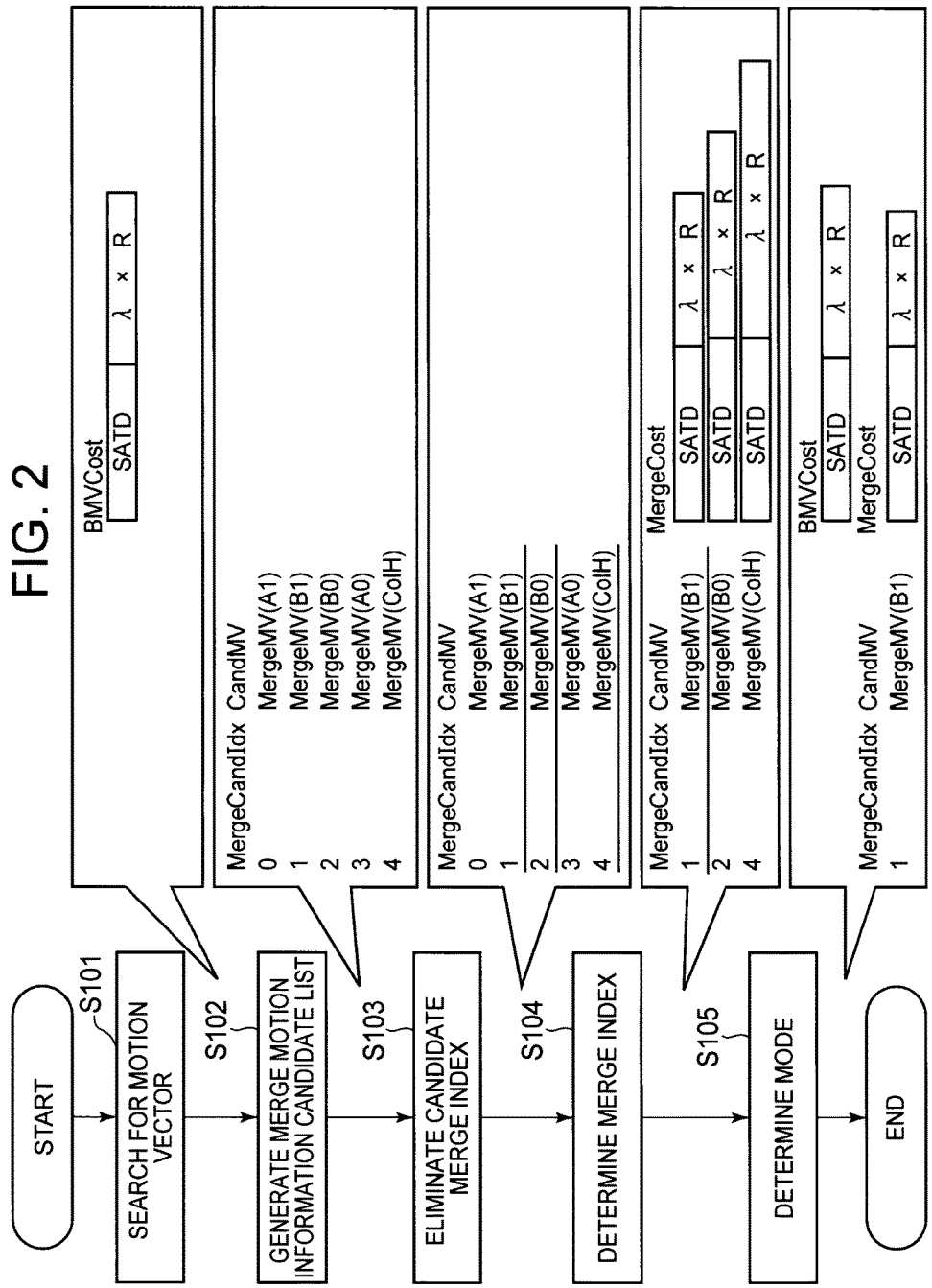
FIG. 2 It is a flowchart depicting the operation of the video encoding device in Exemplary Embodiment 1.

FIG. 2 is a flowchart depicting the operation of the video encoding device depicted in FIG. 1. The operation of the video encoding device is described below, with reference to FIGS. 1 and 2.

In step S101, the motion information search unit 101 searches a reference picture for a motion vector (MV=BMV) relating to a block to be encoded, and computes the coding cost (BMVCost) of the motion vector determined as a result of the search. The coding cost is the sum of the motion compensated prediction error and the amount of auxiliary information. In the example depicted in FIG. 2, SATD is used as the motion compensated prediction error. The amount of auxiliary information is expressed by (λ×motion vector code amount R).

In step S102, the merge motion information candidate list generation unit 102 generates a merge motion information candidate list. In detail, the merge motion information candidate list generation unit 102 computes MergeMV(A1), MergeMV(B0), MergeMV(B1), MergeMV(A0), and MergeMV(ColH). The merge motion information candidate list generation unit 102 then generates the merge motion information candidate list including the merge indices corresponding to these motion vectors.

In this exemplary embodiment, the merge index elimination unit 103 excludes improper merge motion information from information subjected to determination by the merge index determination unit 104. In detail, in step S103, the merge index elimination unit 103 eliminates an improper merge index (or indices) from the merge motion information candidate list generated by the merge motion information candidate list generation unit 102, based on the motion information (motion vector) determined by the motion information search unit 101.

In this exemplary embodiment, the improper merge motion information is motion information that meets at least one of the following two conditions.

(Condition 1) The reference picture of the merge motion information is different from the reference picture of the motion information determined by the motion information search unit 101.

(Condition 2) The difference between the motion vector of the merge motion information and the motion vector determined by the motion information search unit 101 is greater than a predetermined amount. The predetermined amount is, for example, set in the video encoding device beforehand.

Typically, SATD of the motion information (motion vector: BMV) determined as a result of the motion vector search is smaller than SATD of any motion vector MV included in the motion search area. This is because the motion vector search is a search for such motion information that reduces the motion compensated prediction error. Hence, SATD of BMV is typically smaller than SATD of merge motion information included in the motion search area. Based on this property, improper merge motion information is screened out from the merge motion information candidate list using BMV in this exemplary embodiment.

Here, the relationships between BMV and MergeMV (A1), MergeMV(B1), MergeMV(B0), MergeMV(A0), and MergeMV(ColH) are as depicted in FIG. 11 as an example. In detail, the reference picture of MergeMV(A1) is different from the reference picture of the motion information determined by the motion information search unit 101. The reference picture of MergeMV(A0) is the same as the reference picture of the motion information determined by the motion information search unit 101, but its difference from the motion vector determined by the motion information search unit 101 is greater than the predetermined amount.

Accordingly, the merge index elimination unit 103 eliminates MergeCandIdx=0 corresponding to MergeMV(A1) from the merge motion information candidate list, based on Condition 1. The merge index elimination unit 103 also eliminates MergeCandIdx=3 corresponding to MergeMV(A0) from the merge motion information candidate list, based on Condition 2.

In step S104, the merge index determination unit 104 determines a merge index. In detail, the merge index determination unit 104 computes the respective coding costs of MergeMV(B0), MergeMV(B1), and MergeMV(ColH) corresponding to the merge indices remaining in the merge motion information candidate list, specifies a motion vector with the smallest coding cost, and selects the merge index (MergeCandIdx) of the specified motion vector. In the example depicted in FIG. 2, the coding cost of MergeMV(B1) is smallest.

After this, in step S105, the merge index determination unit 104 determines a mode. In other words, the merge index determination unit 104 determines whether MergeCandIdx determined in the process of step S104 or the normal motion vector (BMV) searched for in the process of step S101 is to be transmitted. In detail, the merge index determination unit 104 compares the coding cost of the motion vector (MergeMV(B1) in this example) specified by MergeCandIdx (MergeCandIdx=1 in this example) determined in the process of step S104 and the coding cost of BMV, and determines to transmit the one with the smaller coding cost. In the example depicted in FIG. 2, the coding cost of MergeMV(B1) is smaller.

In this exemplary embodiment, before selecting the merge index from the merge motion information candidate list, the video encoding device eliminates the improper merge index (MergeCandIdx=0 and MergeCandIdx=3 in the example depicted in FIG. 2) from the selection candidates, based on the motion information determined as a result of the motion vector search. Thus, the improper merge index is excluded from the selection, and the computational complexity of computing its coding cost is saved. The average case complexity of computing the coding costs of merge indices can be reduced in this way.

Exemplary Embodiment 2

Figure 3:
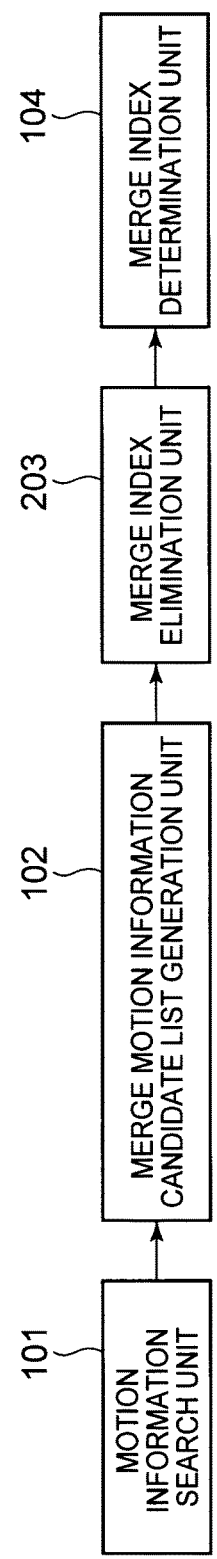
FIG. 3 It is a block diagram depicting Exemplary Embodiment 2 of a video encoding device.

FIG. 3 is a block diagram depicting Exemplary Embodiment 2 of a video encoding device. The video encoding device in Exemplary Embodiment 2 includes a merge index elimination unit 203 instead of the merge index elimination unit 103 in Exemplary Embodiment 1.

The merge index elimination unit 203 has, in addition to the function of the merge index elimination unit 103 in Exemplary Embodiment 1, a function of eliminating a merge index of merge motion information corresponding to a motion vector (or vectors) not included in the search area of the motion information search, from the merge motion information candidate list.

In detail, based on the motion information (motion vector) determined by the motion information search unit 101, the merge index elimination unit 203 eliminates the improper merge index from the merge motion information candidate list generated by the merge motion information candidate list generation unit 102, and also eliminates the merge index of the merge motion information corresponding to the motion vector not included in the search area of the motion information search by the motion information search unit 101 from the merge motion information candidate list.

Figure 4:
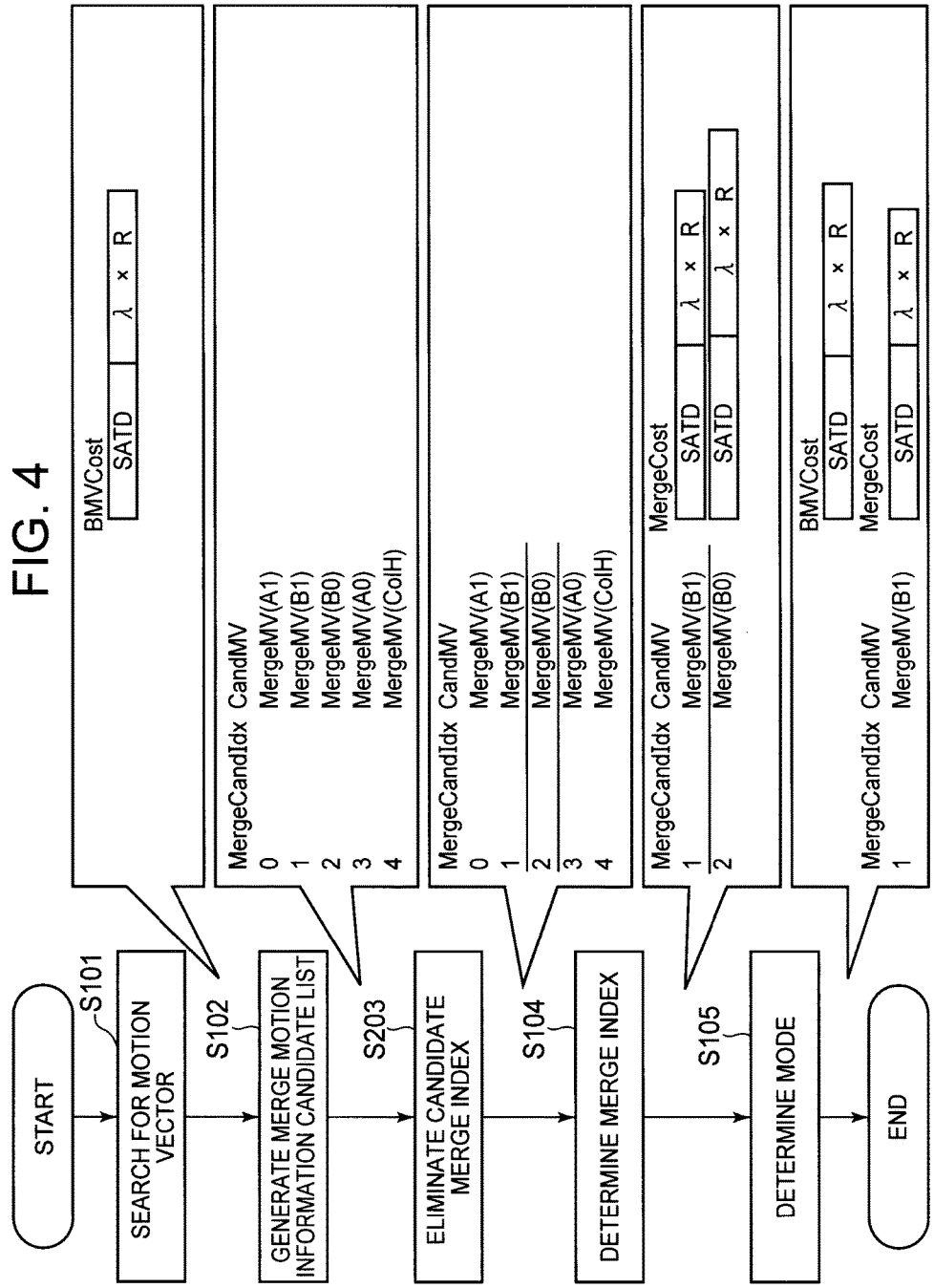
FIG. 4 It is a flowchart depicting the operation of the video encoding device in Exemplary Embodiment 2.

FIG. 4 is a flowchart depicting the operation of the video encoding device depicted in FIG. 3. The operation of the video encoding device is described below, with reference to FIGS. 3 and 4.

The processes of steps S101, S102, S104, and S105 are the same as the processes in Exemplary Embodiment 1.

Here, the relationships between BMV and MergeMV (A1), MergeMV(B1), MergeMV(B0), MergeMV(A0), and MergeMV(ColH) are as depicted in FIG. 11 as an example. In detail, the reference picture of MergeMV(A1) is different from the reference picture of the motion information determined by the motion information search unit 101. The reference picture of MergeMV(A0) is the same as the reference picture of the motion information determined by the motion information search unit 101, but its difference from the motion vector determined by the motion information search unit 101 is greater than the predetermined amount.

In step S203, the merge index elimination unit 203 eliminates MergeCandIdx=0 corresponding to MergeMV(A1) and MergeCandIdx=3 corresponding to MergeMV(A0) from the merge motion information candidate list, as in Exemplary Embodiment 1.

In step S203, the merge index elimination unit 203 also eliminates the merge index (MergeCandIdx=4 corresponding to MergeMV(ColH) in the example depicted in FIG. 4) of the merge motion information corresponding to the motion vector not included in the search area of the motion information search by the motion information search unit 101, from the merge motion information candidate list.

The video encoding device in this exemplary embodiment can further reduce the average case complexity of computing the coding costs of merge indices, as compared with the video encoding device in Exemplary Embodiment 1.

Exemplary Embodiment 3

Figure 5:
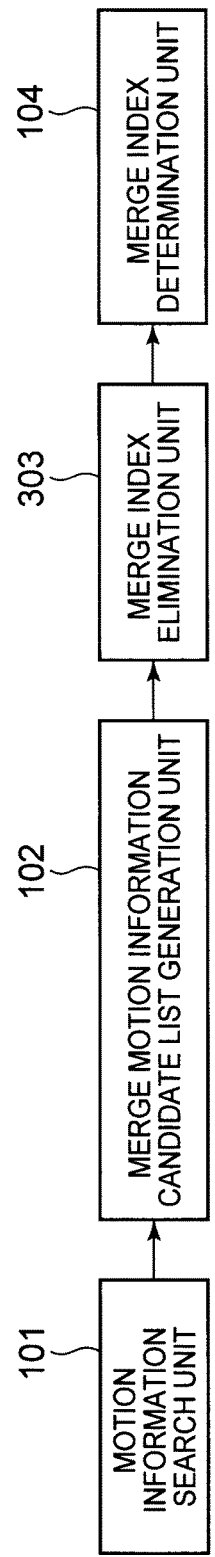
FIG. 5 It is a block diagram depicting Exemplary Embodiment 3 of a video encoding device.

FIG. 5 is a block diagram depicting Exemplary Embodiment 3 of a video encoding device. The video encoding device in Exemplary Embodiment 3 includes a merge index elimination unit 303 instead of the merge index elimination unit 103 in Exemplary Embodiment 1.

The merge index elimination unit 303 has, in addition to the function of the merge index elimination unit 103 in Exemplary Embodiment 1, a function of leaving, from among the merge indices remaining in the merge motion information candidate list, only a merge index corresponding to motion information whose difference from the motion vector determined by the motion information search unit 101 is smallest, as a selection candidate.

Figure 6:
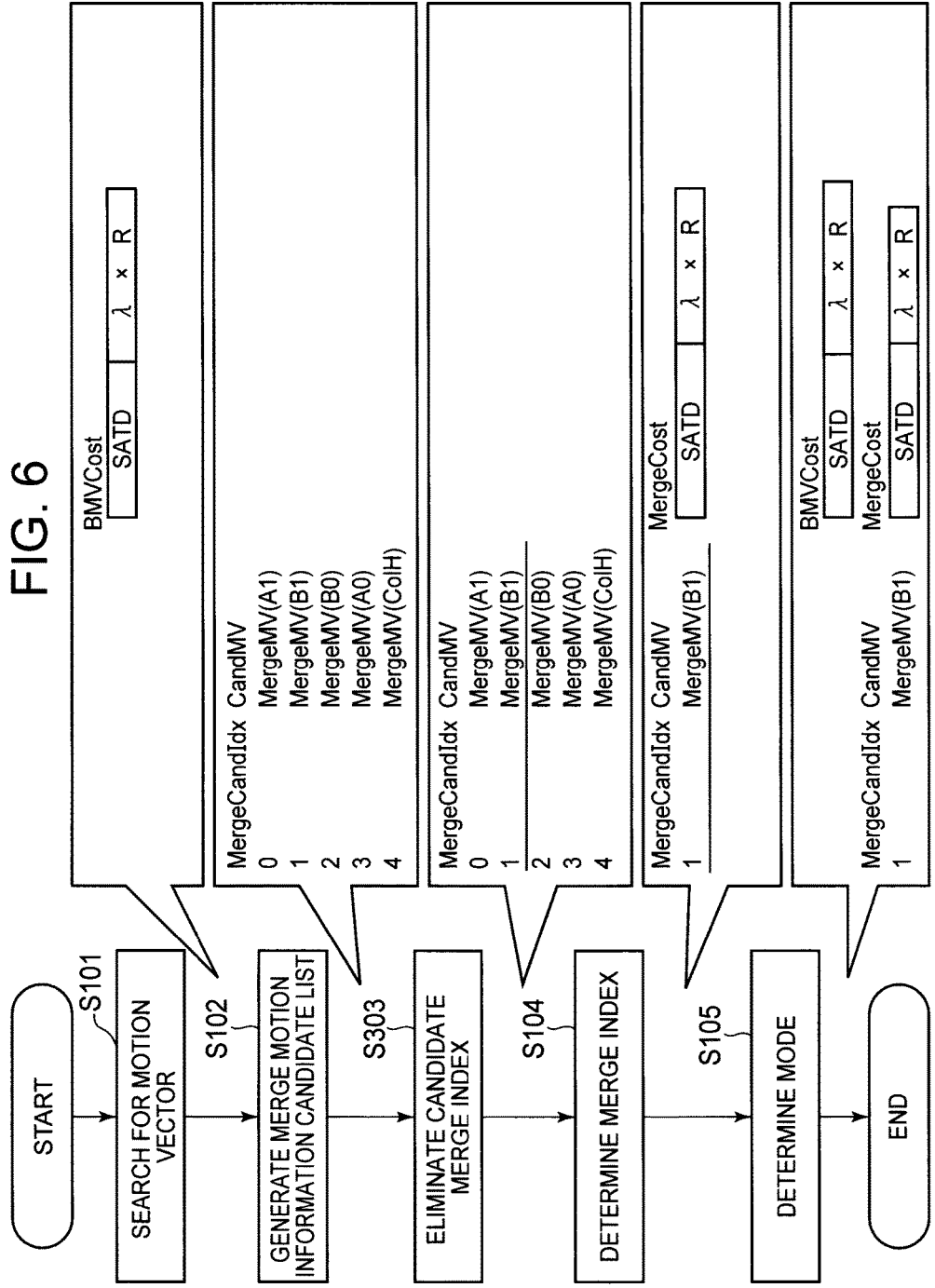
FIG. 6 It is a flowchart depicting the operation of the video encoding device in Exemplary Embodiment 3.

FIG. 6 is a flowchart depicting the operation of the video encoding device depicted in FIG. 5. The operation of the video encoding device is described below, with reference to FIGS. 5 and 6.

The processes of steps S101, S102, S104, and S105 are the same as the processes in Exemplary Embodiments 1 and 2.

Here, the relationships between BMV and MergeMV(A1), MergeMV(B1), MergeMV(B0), MergeMV(A0), and MergeMV(H) are as depicted in FIG. 11 as an example. In detail, the reference picture of MergeMV(A1) is different from the reference picture of the motion information determined by the motion information search unit 101. The reference picture of MergeMV(A0) is the same as the reference picture of the motion information determined by the motion information search unit 101, but its difference from the motion vector determined by the motion information search unit 101 is greater than the predetermined amount.

Accordingly, in step S303, the merge index elimination unit 303 eliminates MergeCandIdx=0 corresponding to MergeMV(A1) from the merge motion information candidate list. The merge index elimination unit 303 also eliminates MergeCandIdx=3 corresponding to MergeMV(A0) from the merge motion information candidate list.

Suppose, of MergeCandIdx=1 corresponding to MergeMV(B1), MergeCandIdx=2 corresponding to MergeMV(B0), and MergeCandIdx=4 corresponding to MergeMV(ColH) remaining in the merge motion information candidate list in FIG. 6, MergeMV(B1) has the smallest difference from the motion vector determined by the motion information search unit 101.

In step S303, the merge index elimination unit 303 leaves only MergeCandIdx=1 corresponding to MergeMV(B1), in the merge motion information candidate list.

In this exemplary embodiment, the merge index elimination unit 303 sets, from among the merge indices remaining in the merge motion information candidate list, the merge index corresponding to the motion information whose difference from the motion vector determined by the motion information search unit 101 is smallest, as a merge index selection candidate. In other words, the merge index elimination unit 303 sets the merge index corresponding to the motion vector similar to BMV, as a merge index selection candidate. Since the number of merge index selection candidates is limited to 1, the average case complexity of computing the coding costs of merge indices can be further reduced.

Although the merge index elimination unit 303 has the function of limiting the number of merge index selection candidates to 1 in addition to the function of the merge index elimination unit 103 in Exemplary Embodiment 1, the merge index elimination unit 303 may have the function of limiting the number of merge index selection candidates to 1 in addition to the function of the merge index elimination unit 203 in Exemplary Embodiment 2.

In each of the exemplary embodiments described above, not only the average case complexity of computing the coding costs of merge indices can be reduced, but also the effect of preventing such merge motion information that increases the motion compensated prediction error from being merged with the block to be encoded can be achieved. For example, since MergeCandIdx=0 corresponding to MergeMV(A1) with large SATD is not selected, local image quality degradation can be prevented.

Exemplary Embodiment 4

Figure 7:
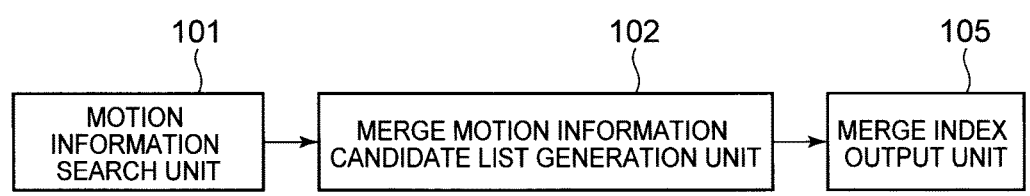
FIG. 7 It is a block diagram depicting Exemplary Embodiment 4 of a video encoding device.

FIG. 7 is a block diagram depicting Exemplary Embodiment 4 of a video encoding device. The video encoding device depicted in FIG. 7 includes the motion information search unit 101, the merge motion information candidate list generation unit 102, and a merge index output unit 105.

The motion information search unit 101 searches for motion information of a block to be encoded, as in Exemplary Embodiments 1 to 3. The merge motion information candidate list generation unit 102 generates a merge motion information candidate list based on motion information of encoded blocks adjacent to the block to be encoded, as in Exemplary Embodiments 1 to 3. The merge index output unit 105 outputs a merge index corresponding to motion information whose coding cost is not smallest of the motion information corresponding to the merge indices included in the merge motion information candidate list.

The operation of the merge index output unit 105 is described below, with reference to the flowcharts in FIGS. 2, 4, and 6.

After the processes of steps S101 and S102, the merge index output unit 105 computes the coding cost of the motion information (motion vector) corresponding to each merge index included in the merge motion information candidate list. The merge index output unit 105 outputs each merge index corresponding to motion information other than the motion information with the smallest coding cost, to the merge index elimination unit 103 (or the merge index elimination unit 203 or the merge index elimination unit 303, not depicted in FIG. 7). The merge index elimination unit 103, 203, or 303 executes the process of step S103, S203, or S303 on each merge index (merge index output from the merge index output unit 105) corresponding to motion information other than the motion information with the smallest coding cost included in the merge motion information candidate list.

The merge index output unit 105 is applicable to any of Exemplary Embodiments 1, 2, and 3 described above.

Although the merge index output unit 105 in this exemplary embodiment outputs each merge index corresponding to motion information whose coding cost is not smallest, the merge index output unit 105 may output a merge index corresponding to motion information whose coding cost is smallest. In such a case, the merge index elimination unit 103 (or the merge index elimination unit 203 or the merge index elimination unit 303, not depicted in FIG. 7) sets each merge index other than the merge index output from the merge index output unit 105, as an elimination candidate.

In this exemplary embodiment, the merge index corresponding to the motion information with the smallest coding cost is not set as an improper merge index. This prevents a decrease in subjective quality (perceived quality) of video.

Each of the exemplary embodiments described above may be realized by hardware, or by a computer program recorded in a recording medium as an example.

Figure 8:
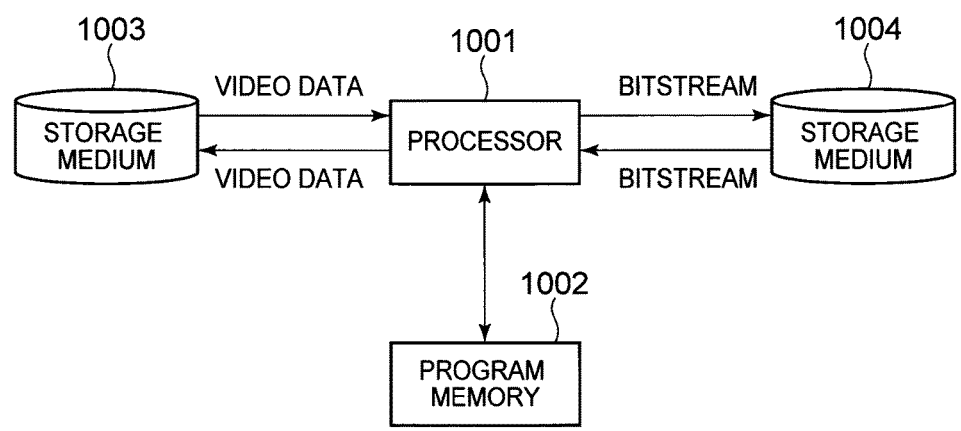
FIG. 8 It is a block diagram depicting a structural example of an information processing system capable of realizing the functions of a video encoding device according to the present invention.
Figure 9:
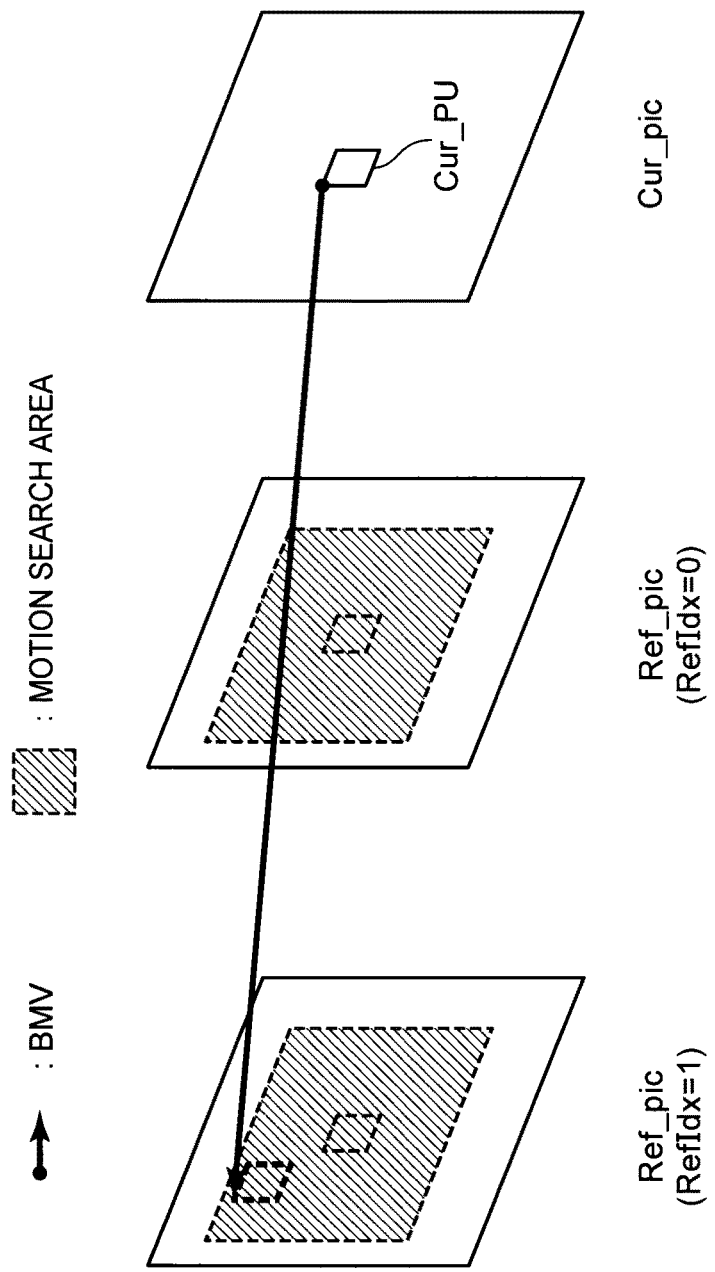
FIG. 9 It is a conceptual diagram depicting a state where a combination of a reference picture index and a motion vector used for motion compensated prediction is determined.
Figure 10:
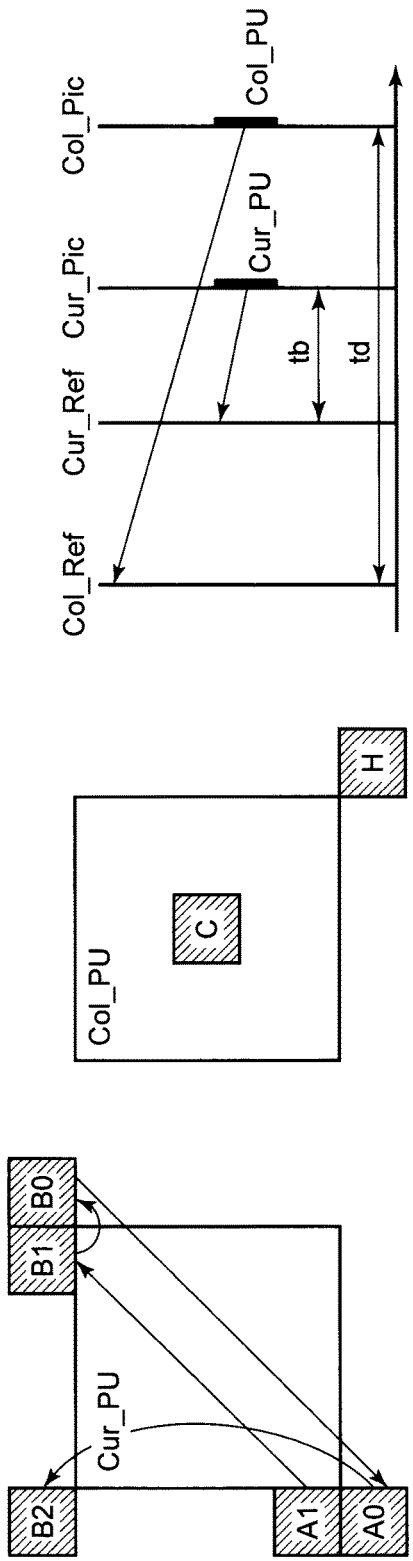
FIG. 10 It is an explanatory diagram of a merge mode.

An information processing system depicted in FIG. 8 includes a processor 1001, a program memory 1002, a storage medium (recording medium) 1003 for storing video data, and a storage medium 1004 for storing data such as a bitstream. The storage medium 1003 and the storage medium 1004 may be separate storage media, or storage areas in the same storage medium. A magnetic storage medium such as a hard disk is available as the storage medium. In the storage medium 1003, an area in which at least a program is stored is a non-transitory tangible storage area (non-transitory tangible media).

In the information processing system depicted in FIG. 8, a program for realizing the functions of the blocks depicted in each of FIGS. 1, 3, 5, and 7 is stored in the program memory 1002. The processor 1001 realizes the functions of the video encoding device depicted in each of FIGS. 1, 3, 5, and 7, by executing processes according to the program stored in the program memory 1002.

While the present invention has been described with reference to the exemplary embodiments and examples, the present invention is not limited to these exemplary embodiments and examples. Various changes understandable by those skilled in the art can be made to the structures and details of the present invention within the scope of the present invention.

This application claims priority based on Japanese Patent Application No. 2012-244700 filed on Nov. 6, 2012, the disclosure of which is incorporated herein in its entirety.

REFERENCE SIGNS LIST 101 motion information search unit
102 merge motion information candidate list generation unit
103, 203, 303 merge index elimination unit
104 merge index determination unit
105 merge index output unit
1001 processor
1002 program memory
1003 storage medium
1004 storage medium

What is claimed is:

1. A video encoding method, implemented by a processor, comprising:
searching for motion information of a block to be encoded;
generating a merge motion information candidate list based on motion information of encoded blocks adjacent to the block to be encoded;
eliminating an exclusion object merge index or indexes from the merge motion information candidate list, using the motion information determined as a result of the search for the motion information; and
determining a merge mode, using a merge index of merge motion information in the merge motion information candidate list from which the exclusion object merge index has been eliminated,
wherein the exclusion object merge index is a merge index corresponding to at least one of: merge motion information based on a reference picture different from a reference picture of the motion information determined as a result of the search for the motion information; and merge motion information whose difference from the motion information determined as a result of the search for the motion information is greater than a predetermined amount.

2. The video encoding method according to claim 1, wherein a merge index corresponding to motion information not included in an area of the search for the motion information is further eliminated from the merge motion information candidate list, as the exclusion object merge index.

3. The video encoding method according to claim 1, wherein the merge mode is determined using, from among one or more merge indices included in the merge motion information candidate list from which the exclusion object merge index has been eliminated, a merge index corresponding to motion information whose difference from the motion information determined as a result of the search for the motion information is smallest.

4. A video encoding device comprising:
at least one processor configured to execute computer-readable instructions to implement;
a motion information search unit which searches for motion information of a block to be encoded;
a merge motion information candidate list generation unit which generates a merge motion information candidate list based on motion information of encoded blocks adjacent to the block to be encoded;
a merge index elimination unit which eliminates an exclusion object merge index or indexes from the merge motion information candidate list, using the motion information determined by the motion information search unit; and
a merge index determination unit which determines a merge mode, using a merge index of merge motion information in the merge motion information candidate list from which the exclusion object merge index has been eliminated,
wherein the exclusion object merge index is a merge index corresponding to at least one of: merge motion information based on a reference picture different from a reference picture of the motion information determined by the motion information search unit; and merge motion information whose difference from the motion information determined by the motion information search unit is greater than a predetermined amount.

5. The video encoding device according to claim 4, wherein the merge index elimination unit further eliminates a merge index corresponding to motion information not included in an area of the search by the motion information search unit, from the merge motion information candidate list as the exclusion object merge index.

6. The video encoding device according to claim 4, wherein the merge index determination unit determines the merge mode using, from among one or more merge indices included in the merge motion information candidate list from which the exclusion object merge index has been eliminated, a merge index corresponding to motion information whose difference from the motion information determined as a result of the search for the motion information is smallest.

7. A non-transitory computer-readable recording medium in which a video encoding program is recorded, wherein upon operating based on the video encoding program, a processor:
  searches for motion information of a block to be encoded;
  generates a merge motion information candidate list based on motion information of encoded blocks adjacent to the block to be encoded;
  eliminates an exclusion object merge index or indexes from the merge motion information candidate list, using the motion information determined as a result of the search for the motion information; and
  determines a merge mode, using a merge index of merge motion information in the merge motion information candidate list from which the exclusion object merge index has been eliminated,
  wherein the exclusion object merge index is a merge index corresponding to at least one of: merge motion information based on a reference picture different from a reference picture of the motion information determined as a result of the search for the motion information; and merge motion information whose difference from the motion information determined as a result of the search for the motion information is greater than a predetermined amount.

8. The non-transitory computer-readable recording medium according to claim 7, wherein when operating based on the video encoding program, the processor eliminates a merge index corresponding to motion information not included in an area of the search for the motion information, from the merge motion information candidate list as the exclusion object merge index.

9. The non-transitory computer-readable recording medium according to claim 7, wherein upon operating based on the video encoding program, the processor determines the merge mode using, from among one or more merge indices included in the merge motion information candidate list from which the exclusion object merge index has been eliminated, a merge index corresponding to motion information whose difference from the motion information determined as a result of the search for the motion information is smallest.

* * * * *